March 22, 1966
E. BURNS ET AL
3,241,527
TRAILABLE CATTLE LOADER
Filed June 25, 1964
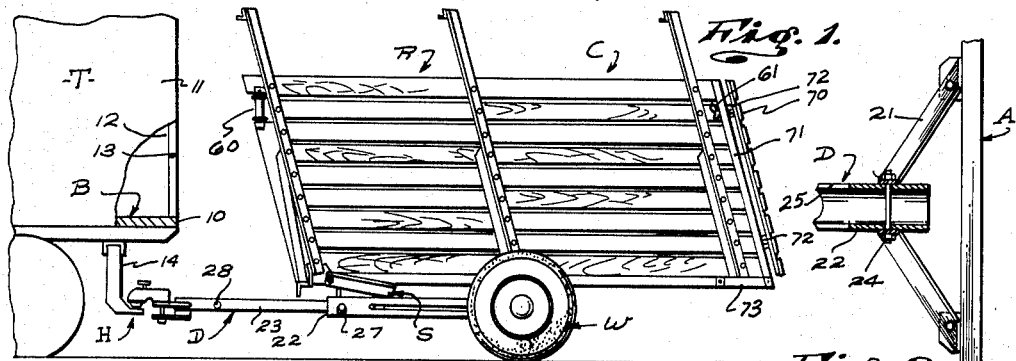
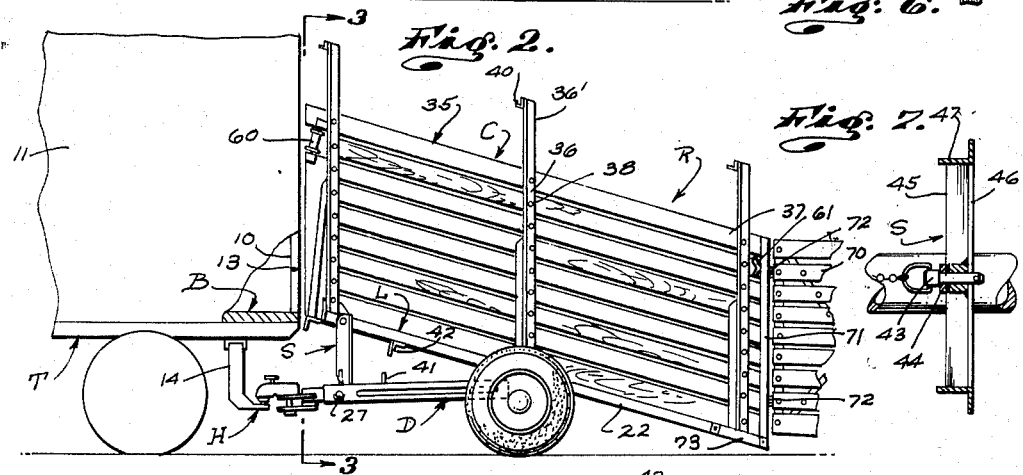
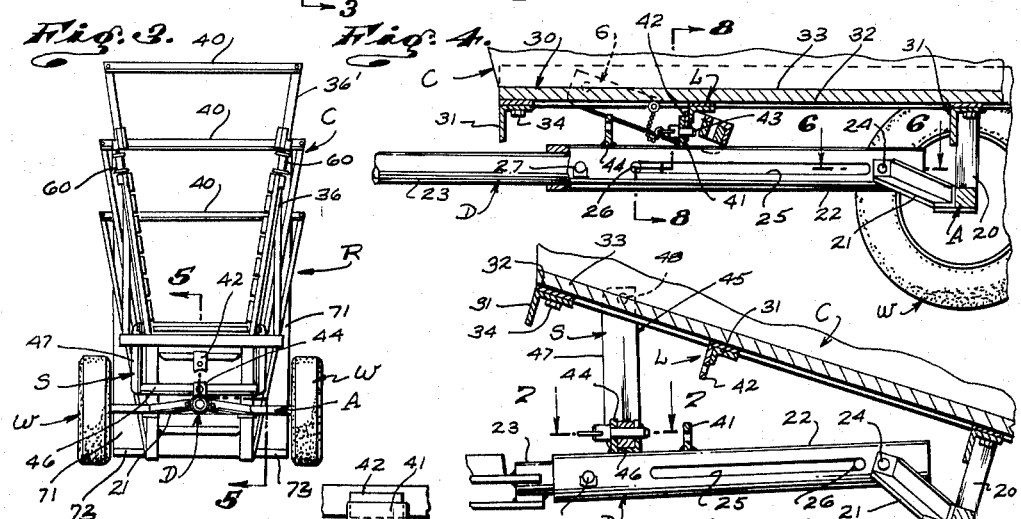
INVENTOR.
Erwin Burns
Wayne Boyles
BY
George A. Maxwell

United States Patent Office 3,241,527
Patented Mar. 22, 1966

3,241,527
TRAILABLE CATTLE LOADER
Erwin Burns, Los Angeles, and Wayne Boyles, La Puente,
Calif. (both % Burns Tool Co., 8346 Salt Lake Ave.,
Bell, Calif.)
Filed June 25, 1964, Ser. No. 377,843
2 Claims. (Cl. 119—82)

This invention relates to a cattle loader and is more particularly concerned with an improved trailable cattle loading ramp or chute adapted for use in combination with a cattle transport truck, in open range country.

The need and desirability of a simple, practical and easy to operate trailable cattle loading device of the general character referred to has long been recognized.

In the art of open range cattle ranching, it is desirable and often necessary to move the cattle over distances of many miles. The desirability or necessity for so moving cattle is dependent upon such factors as maintaining the herds balanced for the most effective and efficient use of available feed and water; for purposes of breeding, medical care, marketing and the like.

In past years such movement of cattle was carried out entirely by men on horseback. The cattle were herded and driven across the land.

This method or process of moving cattle was extremely slow, required the assistance of a large number of men and equipment and resulted in the running off and loss of considerable weight on the cattle so driven.

In recent years, the use of trucks to move cattle on and about range land has become common practice.

With the use of trucks, the ordinary rancher can, by himself, drive a truck with his horse loaded thereon, onto and across the range, unload his horse, round up and drive the desired cattle back to the truck, load the cattle and his horse thereon, and then transport the cattle, by truck, to the desired new location. Such practice saves many hours, eliminates the need of extra hands or men and materially reduced the distance the cattle must be driven and the resulting loss of weight thereon.

The principal difficulty in the use of trucks for the purpose set forth above resides in the necessity of providing means to facilitate loading and unloading the cattle onto and from the trucks.

At the present time, the above difficulty is overcome by the provision of permanent loading ramps and the like at predetermined spaced intervals throughout the range land. The establishment and maintenance of such permanent loading ramps is costly and troublesome. Further, while the use of trucks and such permanent cattle loading ramps or means about the range land materially reduces the number of men required to move the cattle, materially reduces the distance and the time required to move the cattle, and materially reduces the weight loss factor mentioned above, it is nevertheless only a partial answer or remedy to the problem sought to be overcome.

It is obvious and well recognized that the most effective and efficient use of trucks, for moving cattle on open range land can only be achieved by driving the trucks to the cattle, loading the cattle thereon, and then transporting the cattle as desired. This cannot be accomplished with permanent loading ramps or means established on and about the range land, but requires the provision of a suitable means for loading the cattle on the trucks which can be carried or trailed by the trucks to the site of the cattle.

The prior art has provided several trailable cattle loading constructions adapted to be trailed behind cattle trucks onto and across range land and operable to facilitate the loading of cattle onto the trucks. The structures thus far provided, however, have met with little or no success since each has been of a nature that requires it to be unhitched or disconnected from the truck to which it is related and then manually arranged and set up in a special predetermined relationship with the truck. Since such structures are necessarily large and heavy, it requires at least two men to set them up.

It has been determined that the time, trouble and complications of setting up the trailable cattle loading devices provided by the prior art materially diminishes their desirability and that the expense of hiring and keeping an extra man to help set up and take down such devices or constructions, renders them uneconomical to use, except in large scale operations where a great number of cattle are being moved and ample manpower is present and available, without the need of hiring special help.

An object of the present invention is to provide an improved trailable cattle loading construction which is such that it need not be disconnected or unhitched from its related towing vehicle or cattle truck and which is such that it can be easily and quickly shifted from a trailable position to a loading position, or vice versa, by one man.

Another object of our invention is to provide a trailable cattle loading construction of the character referred to having a transversely extending axle member with a pair of laterally spaced supporting wheels, and elongate longitudinally extending tongue projecting forwardly from the axle member and having means at its forward end to connect with the rear end of a truck with which the construction is related and an elongate longitudinally extending ramp and/or chute pivotally supported by the axle member.

A feature of our invention is to provide structure of the general character referred to wherein the ramp is shiftable from a trailable, horizontal position where it occurs in spaced relationship above the ground throughout its longitudinal extent, to an inclined loading position where its rear end rests on the ground and its upper end occurs in a common plane with the load carrying bed of the truck with which it is related.

Another feature of our invention is to provide a structure of the character referred to wherein the tongue is established of two axially shiftable sections whereby the axle, wheels, and chute can be shifted forwardly so that the forward end of the ramp or chute occurs adjacent the rearend of the truck bed when the ramp is in its loading position and so that the axle, wheels and ramp can be shifted rearwardly relative to the truck so that the forward end of the ramp is clear of the rear end of the truck when it is shifted to its horizontal, trailable position.

Another object and feature of this invention is to provide a structure of the character referred to wherein a releasable support means is provided between the tongue and the forward portion of the chute or ramp, to releasably support the chute in its loading position and so that the forward end of the ramp need not be fastened to or supported by the bed of the truck.

A further object of this invention is to provide a structure of the character referred to having lock means to releasably hold the ramp in its trailable position and to releasably lock and hold the tongue in each of its two positions.

Still another object of our invention is to provide a structure of the character referred to wherein the ramp is provided with upwardly projecting side walls cooperating therewith to define a chute through which the cattle can be advantageously directed and driven.

Another object is to provide the side walls of the chute or ramp with normally forwardly and upwardly inclined front and rear ends, whereby the ends of the side walls are vertically disposed when the construction is in its loading position and the forward end of the side walls occur in adjacent, parallel relationship with the vertical end wall or tail gate of the truck to which it is related and thereby leaves no gap through which cattle might seek to escape.

Still another object of our invention is to provide frame members for supporting the side walls of the chute which members project upwardly from and thence across the chute to provide means for keeping the heads of the cattle driven through the chute down, and thereby prevent or inhibit the cattle from attempting to jump from the chute.

It is another object of my invention to provide suitable rigging to facilitate dragging reluctant cattle into and up the chute.

Finally, it is an object of this invention to provide a structure of the character referred to which is easy and economical to manufacture, a structure which is rugged and durable and a structure which is easy to operate.

The various objects and features of our invention will be fully understood from the following detailed description of a typical preferred form and application of our invention, throughout which description reference is made to the accompanying drawings, in which:

FIGURE 1 is a side elevational view of our new cattle loading construction, showing it related to the rear end of a cattle transporting truck and in its trailable position;

FIGURE 2 is a view similar to FIGURE 1 and showing the structure in its loading position;

FIGURE 3 is an end view taken substantially as indicated by line 3—3 on FIGURE 2;

FIGURE 4 is a longitudinal sectional view of a portion of my new construction, showing certain parts in their trailable position;

FIGURE 5 is a view similar to FIGURE 4, taken substantially as indicated by line 5—5 on FIGURE 3, and showing the parts in their loading position;

FIGURE 6 is a sectional view taken as indicated by line 6—6 on FIGURE 4, and;

FIGURE 7 is a sectional view taken as indicated by line 7—7 on FIGURE 5, and;

FIGURE 8 is a sectional view taken as indicated by line 8—8 on FIGURE 4.

The cattle loading construction R, provided by the present invention is adapted to be releasably related to a cattle transporting truck T having a flat horizontally disposed bed B with a rear edge 10, vertical side walls 11, and a tail gate 12. The tail gate 12 can be provided with a gated opening 13 corresponding in size and shape with the cross-section of the chute provided by the present invention and as will hereinafter be described.

The truck T is further provided with a tow bar 14 arranged below the rear end portion of the bed B. An element of a trailer hitch H is fixed to and carried by the tow bar.

The cattle loading construction R is an elongate fabricated construction with front and rear ends and comprises generally, an elongated horizontally disposed transversely extending axle A, intermediate the ends of the construction, and supporting wheels W at each end of the axle. The axle has a pair of laterally spaced upwardly projecting mounting posts 20 fixed thereto as by welding. The posts 20 are adapted to connect with and support an elongate chute-like structure C as will hereinafter be described.

The axle A is further provided with a pair of laterally spaced horizontally disposed, forwardly and laterally inwardly convergent mounting arms 21, formed of angle iron and fixed to the axle as by welding. The mounting arms 21 are adapted to connect with the rear end of an elongate substantially horizontally disposed tongue D.

The tongue D is an elongate sectional structure having an outer rear tube section 22 and an inner forward tube section 23 slidably engaged in the rear section 22, from the forward end thereof and projecting forwardly therefrom.

The rear end of the rear section 22 is pivotally connected with the inner forward ends of the mounting arms 21 by means of a bolt-type fastener 24 projecting through the tube section, as clearly illustrated in FIGURES 4, 5 and 6 of the drawings.

The outer rear tube section 22 is provided with a pair of elongate longitudinally extending slots 25, at its opposite sides. The rear end of the inner tube section 23 is provided with a transversely extending pin 26, the ends of which project into the slots 25. The pin 26 cooperates with the slots 25 to limit relative longitudinal movement of the sections 22 and 23 and to prevent relative rotation therebetween.

A lock pin 27 is carried by the outer section 22 of the tongue, at the forward end portion thereof. The pin 27 is adapted to be releasably engaged in an opening (not shown) in the rear portion of the inner section 23, when the construction is in its trailable position, (as illustrated in FIGURES 1 and 4 of the drawings) and to be releasably engaged in an opening 28 in the forward portion of the section 23 (see FIGURE 1) when the construction is in its loading position.

The forward end of the section 23 carries elements of the trailer hitch H, which cooperatively engage the element or member of the hitch H carried by the tow bar 14 on the truck T.

Since the particular hitching means that is employed can be varied widely in form without departing from the spirit of this invention, we will not burden this specification with unnecessary detailed description of the particular hitch means that is illustrated or the manner in which the said hitch is fixed to the tongue D.

The chute C that we provide is an elongate structure fabricated of angle iron and wood. The chute C has a flat horizontally disposed bottom wall or ramp 30 made up of a plurality of longitudinally spaced horizontal, transversely extending angle iron frame members 31, longitudinally extending angle iron stringers 32 fixed to and extending between the ends of the members 31, at the sides of the ramp and an elongate longitudinally extending wooden deck 33 affixed to the tops of the members 31 and 32, as by means of suitable screw fasteners 34.

The mounting posts 20 on the axle A engage and are fixed to one of the horizontal, transversely extending frame members 31, as by welding. In practice, the mounting posts are fixed to a member 31 intermediate the ends of the chute so that the chute is substantially pivotally balanced on the posts and through the axle members, and wheels W and so that it can be easily pivoted from one to the other of its two positions, by one person.

In addition to the foregoing the chute C is shown as including side walls 35. The side walls 35 are fabricated of angle iron frame members 36 and wooden planks 37. The members 36 are suitably fixed to the stringers 22 of the ramp portion of the chute and project upwardly and forwardly therefrom, as clearly illustrated in the drawings.

The planks 37 are simple elongate, longitudinally extending wooden planks and are fixed to the inner sides of the members 36 by suitable fasteners 38.

In the preferred carrying out of the invention, the side walls 35 are upwardly and laterally outwardly inclined so that the chute C is narrower at the bottom than at the top, as clearly illustrated in FIGURE 3 of the drawings.

Further, in accordance with the preferred carrying out of the invention, the frame members 36 have upwardly projecting extensions 36'. Fixed to and extending between the upper ends of the extensions 36' are horizontal, transversely extending tie rods or bars 40.

The extensions and the tie bars serve to reinforce and support the side wall 35 of the chute and prevent them from being displaced laterally outwardly by the weight of cattle bearing against them as the cattle are driven through the chute, and also serve as apparent barriers which the cattle see and pass under, as they move through the chute. The cattle are thereby effectively inhibited from jumping or otherwise seeking to escape from the chute.

In addition to the foregoing, our new construction includes locking means L for releasably holding the chute C in its trailable position, and support means S for releasably supporting and holding the chute C in its loading position.

The means L includes an apertured plate 41 fixed to and projecting upwardly from the outer rear section 22 of the tongue D, an apertured plate 42 fixed to and depending from a frame member 31 of the chute C and adapted to occur adjacent the plate 41 when the chute is in its trailable position and with the apertures in the plates in axial alignment; and a lock pin 43 releasably engaged through the apertured plates.

The supporting means S that we provide includes an upwardly projecting apertured plate 44 on the forward end portion of the outer rear section 22 of the tongue D, a U-shaped support member 45 having a horizontally disposed base 46 extending transverse the longitudinal axis of the construction, below the chute, and parallel legs 47 on the ends of the base 46. The outer ends of the legs are pivotally connected to the stringers 22 of the chute, at the forward ends thereof by suitable pins 47.

The support is shiftable from a substantially horizontally disposed position, when the construction is in its trailable position, as illustrated in FIGURES 1 and 4 of the drawings; to a vertical position, where the construction is in its loading position and as illustrated in FIGURES 2, 3 and 5 of the drawings. When the support is in its vertical position, the base 46 rests on the top of the outer rear section 22 of the tongue and stops against the apertured plate 44. The base 46 is shown provided with a block having an aperture therein to register with the aperture in the plate 44 and in which a lock pin can be releasably engaged to hold the construction in locked loading position.

In the case illustrated, the pin 43 employed in connection with the locking means L and referred to above, is also used in connection with the means S, thereby eliminating the necessity of providing two separate pins.

The construction is normally in its trailable position, as illustrated in FIGURE 1 of the drawings and where the tongue D is in its fully extended position and the chute C is in its horizontal position where its front end is spaced rearwardly from the rear edge 10 of the truck bed B and its rear end is elevated above and space from the ground.

When thus disposed, it will be apparent that the construction can be easily and conveniently trailed behind the truck and across range land.

When it is desired to unload or load a horse and/or cattle from or onto the truck T, the pin 43 is pulled from engagement in the plates 41 and 42 of lock means L, and the chute C is pivoted to the loading position shown in FIGURE 2 of the drawings, where the rear end engages the ground and the front end of the ramp portion of the chute is in a common plane with the bed of the truck and the front edges of the side walls 35 of the chute are vertically disposed.

The supporting means S is then pivoted down from the position shown in FIGURE 1 to the position shown in FIGURE 2, where it supports the forward end of the chute in the loading position. The pin 43 is engaged with the support means to hold it in loading position.

The lock pin 27 related to the tongue D is then pulled from engagement between the sections 22 and 23 of the tongue, and the truck is backed up towards the chute, or the construction R is pulled forwardly towards the truck and to the loading position shown in FIGURE 2 of the drawings, where the front end of the ramp portion of the chute occurs adjacent the rear edge 10 of the truck bed B, and the front edges of the side walls 35 of the chute are vertically disposed and occur adjacent and parallel with the tail gate 12 of the truck.

The lock pin 27 is then engaged in the opening 28 to lock the tongue in said loading position.

When the construction R is thus positioned, the tail gate 12 or a closure member at an opening in the tail gate and communicating with the chute is removed and the construction is ready for use.

After the construction is used, the above procedure is simply reversed and the construction is again ready to be trailed behind the truck and across the range land.

The entire operation of setting the construction up for use or returning it to its normal trailable position can be easily performed by one man, with little effort, and in a few minutes time.

The construction that we provide is further provided with a roller or sheave 60 at the forward end of at least one side wall 35 and a cleet 61 at the rear end thereof.

When a steer or the like refuses to enter the chute C, a rope is placed about its neck and is fed up through the chute about the sheave 60 and thence back to the cleet 61. The rancher or operator can then engage the length of rope related to the cleet 61 and manually, or by means of his horse, drag the animal into the chute. Once in the chute, the animal can be easily driven therethrough and into the truck T.

Still further, in the preferred carrying out of our invention, and as illustrated in the drawings, a gate 70 is provided for the rear end of the chute. The gate 70 is a rectangular assembly made up of angle iron and planks in a manner similar to the sides of the chute.

The rear end of the chute is provided with laterally outwardly projecting wing-like extensions 71 which cooperate to define a rectangular rear end plane at the rear of the chute to cooperate with the gate 70. The extensions 71 are reinforced or stiffened by means of suitable iron braces 73.

The gate 70 is pivotally mounted on one of the extensions 71 by means of suitable hinges 72 and so that it is free to swing from a closed position where it overlies the end of the chute, as shown in FIG. 1 of the drawings, to an open position, as shown in FIG. 2 of the drawings, where it extends parallel with the longitudinal axis of the construction.

Due to the forwardly and upwardly inclined relationship of the rear end of the chute, it will be apparent that when the chute is in its up or loading position, the pivotal axis of the gate 70 is vertically disposed and the gate can be easily and conveniently operated.

From the foregoing, it will be apparent that we have invented an extremely simple, highly effective, dependable and easy to operate trailable cattle loading construction.

It is to be understood that many of the details of construction illustrated in the drawings and described in the foregoing are only intended to disclose one carrying out or embodiment of the invention, and that in practice, most of said details can be varied widely without departing from the spirit of the invention.

Having described a typical preferred form and application of our invention, we do not wish to be limited or restricted to the specific details herein set forth, but wish to reserve to ourselves any modifications and/or variations that may appear to those skilled in the art, and which fall within the scope of the following claims:

Having described our invention, we claim:

1. A cattle loader of the character referred to including an elongate chute having a longitudinally extending bottom ramp, laterally spaced upwardly projecting longitudinal side walls and open front and rear ends, supporting means fixed to the bottom of the ramp intermediate its ends and extending transversely thereof, a tongue, a pair of support wheels rotatably carried by the supporting means to occur at the opposite sides of the chute, said chute having means for rotating it about the axle relative to the tongue from a horizontal trailable position to a forwardly and upwardly inclined loading position where the rear end of the ramp occurs adjacent the ground and the forward end of the ramp occurs in a common plane with the bed of a truck with which the loader is related, said tongue comprising an elongated extensible means having a rear section connection to the supporting means and a forward section engageable with towing means at the rear end of the truck, said tongue being shiftable from an extended trailable position where the front end of the chute is spaced rearwardly from the bed of the truck, to a shortened position where the front end of the ramp occurs adjacent the bed of the truck when the chute is in its loading position, the front and rear ends of the side walls of the chute being forwardly and upwardly inclined relative to the longitudinal axis of the chute whereby the ends of the chute are vertically disposed when the chute is in its loading position, and support means carried by and forward end of the chute and engageable with said tongue to hold the forward end of the chute up in fixed relationship to the tongue, when the chute is in its loading position.

2. A cattle loader of the character referred to including an elongate chute having a longitudinally extending bottom ramp, laterally spaced upwardly projecting longitudinal side walls and open front and rear ends, an axle fixed to the bottom of the ramp intermediate its ends and extending transversely thereof, a tongue, a pair of support wheels rotatably carried by the axle to occur at the opposite sides of the chute, said chute having means for rotating it about a point forward of and adjacent the axle and relative to the tongue from a horizontal trailable position to a forwardly and upwardly inclined loading position where the rear end of the ramp occurs adjacent the ground and the forward end of the ramp occurs in a common plane with the bed of a truck with which the loader is related, said tongue comprising an elongated extensible tongue having a rear section connected to the axle and a forward section engageable with towing means at the rear end of the truck, said tongue being shiftable from the extended trailable position where the front end of the chute is spaced rearwardly from the bed of the truck, to a shortened position where the front end of the ramp occurs adjacent the bed of the truck when the chute is in its loading position, the front and rear ends of the side walls of the chute being forwardly and upwardly inclined relative to the longitudinal axis of the chute whereby the ends of the chute are vertically disposed when the chute is in its loading position, said chute is provided with longitudinally spaced upwardly and transversely extending frame members on and extending between the side walls of the chute to hold the side walls of the chute in predetermined spaced relationship and to prevent cattle being driven through the chute from jumping out of the chute.

References Cited by the Examiner

UNITED STATES PATENTS

| 409,222 | 8/1889 | McIver | 119—82 |
| 753,833 | 3/1904 | Copeley | 119—82 |
| 814,096 | 3/1906 | Swan | 119—82 |
| 1,224,045 | 4/1917 | Titsworth | 119—82 |
| 2,593,559 | 4/1952 | Heldenbrand | 119—99 |
| 2,754,802 | 7/1956 | Patterson | 119—82 |
| 2,941,813 | 6/1960 | Price | 280—30 |
| 3,020,882 | 2/1962 | Browning | 119—99 X |

FOREIGN PATENTS 112,036   11/1940   Australia.

SAMUEL KOREN, *Primary Examiner.*

ALDRICH F. MEDBERY, *Examiner.*